United States Patent [19]

Schwenke

[11] Patent Number: 5,321,603
[45] Date of Patent: Jun. 14, 1994

[54] PROGRAMMING APPARATUS FOR AN INDUSTRIAL CONTROLLER USING TWO-DIMENSIONAL GRAPHIC BEHAVIOR PROFILES

[75] Inventor: Marvin J. Schwenke, Clinton Township, Macomb County, Mich.

[73] Assignee: Allen-Bradley Company, Inc., Milwaukee, Wis.

[21] Appl. No.: 991,016

[22] Filed: Dec. 15, 1992

[51] Int. Cl.$^5$ ............................................. G05B 11/01
[52] U.S. Cl. ............................... 364/146; 364/926.93; 364/946.2; 364/DIG. 2
[58] Field of Search ............................... 364/140–147, 364/184–193, 946.2, 926.9–926.93, 221, 221.9, 222, 238.3; 395/100, 155–161, 275

[56] References Cited

U.S. PATENT DOCUMENTS

| | | | |
|---|---|---|---|
| 3,813,649 | 5/1974 | Struger et al. | 340/172.5 |
| 3,974,484 | 8/1976 | Struger et al. | 340/172.5 |
| 4,070,702 | 1/1978 | Grants et al. | 364/200 |
| 4,858,102 | 8/1989 | Lovrenich | 364/136 |
| 4,972,310 | 11/1990 | Onodera et al. | 364/140 |
| 5,042,002 | 8/1991 | Zink et al. | 364/900 |
| 5,070,476 | 12/1991 | Fujiwara | 364/140 |
| 5,093,772 | 3/1992 | Senda et al. | 364/140 |
| 5,097,405 | 3/1992 | Sato | 364/140 |
| 5,162,986 | 11/1992 | Graber et al. | 364/146 |
| 5,168,441 | 12/1992 | Onarheim et al. | 364/146 |

Primary Examiner—Jerry Smith
Assistant Examiner—Jim Trammell
Attorney, Agent, or Firm—Quarles & Brady

[57] ABSTRACT

A programmable controller stores and executes a directed sequencer program that responds to the status of input devices and controls a machine having actuators which move a member into a plurality of positions along a linear axis. An apparatus for programming the controller to execute the directed sequencer program comprises a manual data entry device and a monitor for displaying information to a user of the programmable controller. The programming apparatus enables the user to create a graphical behavior profile on the monitor which depicts operation of the machine when the member is in each position. The user also is able to designate whether each of the actuators is to be activated when the member is located at each of the positions, and the status of each input device when the member is located at each of the positions. A indication of one of the plurality of positions at which the member causes the controller to send a signal to the output also is displayed on the monitor. Thereafter, a compiler utilizes the information provided by the user to produce a set of files for the directed sequencer program. Each file corresponds to an operational state of the machine and contains data specifying an expected status of at least some of the input devices, a status for each output and actuator, and an input device which is to change status when a transition should occur to another operational state.

13 Claims, 12 Drawing Sheets

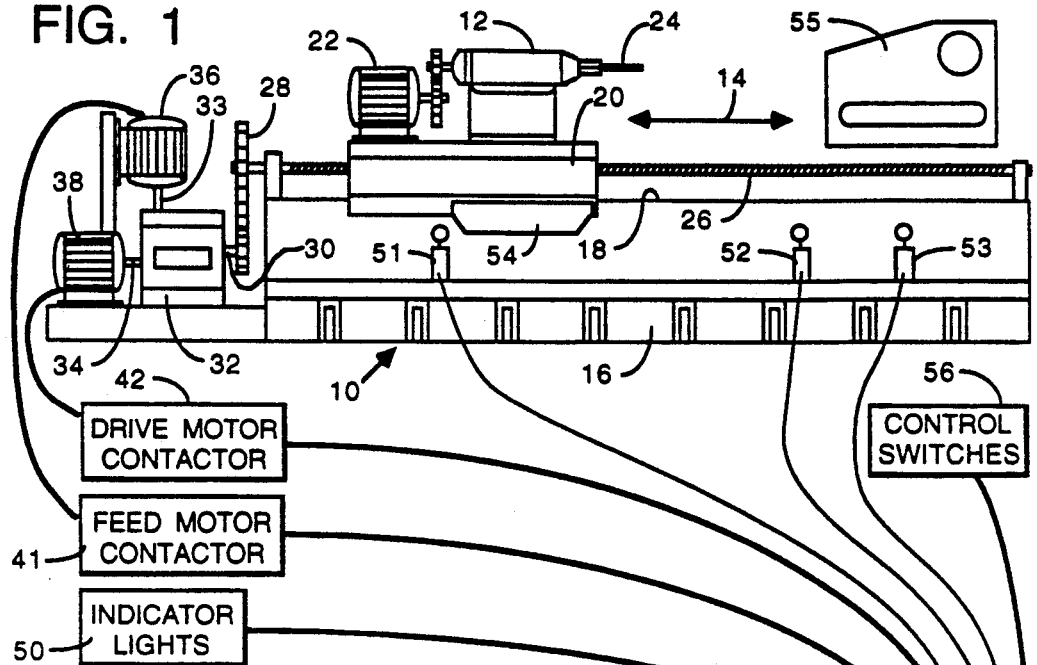
FIG. 1
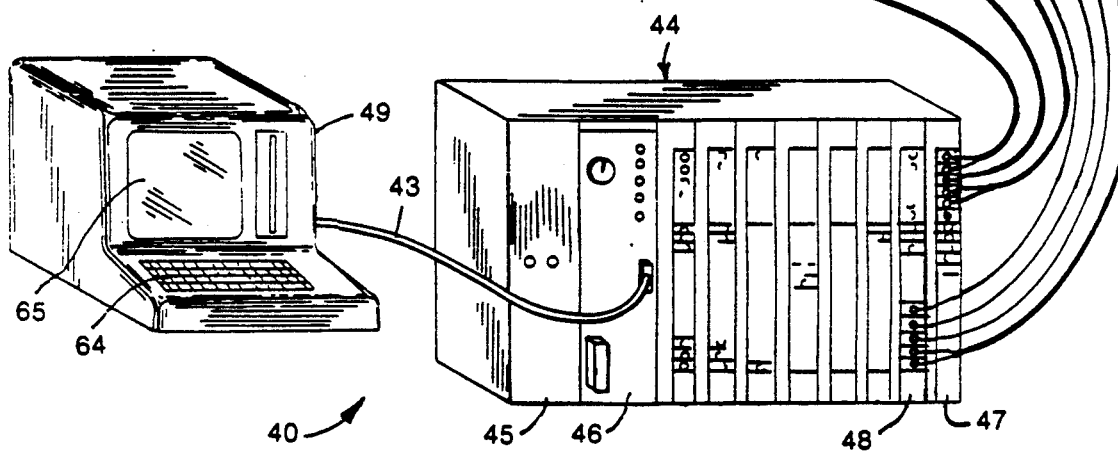
FIG. 2
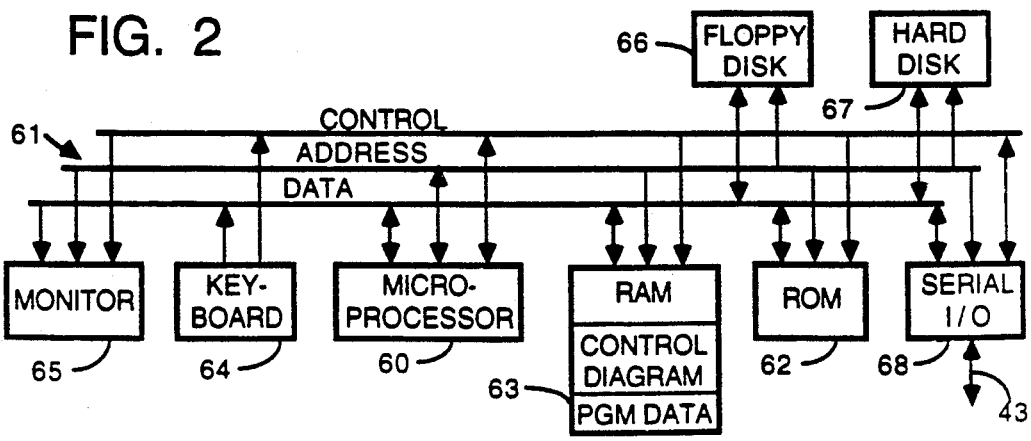

SEQUENCER CONTROL FILE

| | |
|---|---|
| 141 — | CONTROL AND STATUS BITS |
| 142 — | STATE FILE LENGTH |
| 143 — | NUMBER OF SEQUENCE STATES |
| 144 — | CURRENT STATE NUMBER |
| 145 — | PREVIOUS STATE NUMBER |
| 146 — | MAPPED INPUTS |
| 147 — | MAPPED OUTPUTS |
| 148 — | TIMER CONTROL BLOCK |
| 149 — | MESSAGE CONTROL BLOCK |
| 150 — | MESSAGE DATA BLOCK |
| 151 — | INTERNAL USAGE |
| 152 — | INPUT BIT ADDRESSES |
| 153 — | OUTPUT BIT ADDRESSES |

DIRECTED SEQUENCER
STATE DATA SUB-FILE

| | | |
|---|---|---|
| 161 — | STATE NUMBER | |
| 162 — | INPUT LEVELS | |
| 163 — | INPUT MASK | |
| 164 — | OUTPUT MAINTAIN LEVELS | |
| 165 — | OUTPUT LEVELS | |
| 166 — | STATE TIMER PRESET | |
| 168 — | CONTROL BITS | TIMER NEXT STATE — 167 |
| | BIT 0 NEXT STATE | BIT 1 NEXT STATE |
| | BIT 2 NEXT STATE | BIT 3 NEXT STATE |
| 169 | ⋮ | ⋮ |
| | BIT N-2 NEXT STATE | BIT N-1 NEXT STATE |

PROGRAMMING APPARATUS FOR AN INDUSTRIAL CONTROLLER USING TWO-DIMENSIONAL GRAPHIC BEHAVIOR PROFILES

This invention relates to electronic controllers for operating industrial equipment, such as programmable controllers and sequence controllers as generally disclosed in U.S. Pat. Nos. 3,974,484 and 4,742,443; and more particularly to those electronic controllers for controlling movement of a device along a linear axis.

BACKGROUND OF THE INVENTION

Programmable controllers are well known systems for operating industrial equipment, such as assembly lines and machine tools, in accordance with a stored program. In these controllers, a stored control program is executed to examine the condition of specific sensing devices on the controlled equipment, and to energize or de-energize selected operating devices on that equipment contingent upon the status of one or more of the examined sensing devices. The program not only manipulates single-bit input and output data representing the state of the sensing and operating devices, but also performs arithmetic operations, timing and counting functions, and more complex processing operations.

In carrying out its functions, the programmable controller processor is expected to execute well-known programmable controller type instructions. Such instructions have become quite standardized in the industry and they are directly associated with the elements of a ladder logic diagram which is easily understood by control engineers. Program panels such as those described in U.S. Pat. Nos. 3,813,649 and 4,070,702 have been developed to assist the user in developing and editing ladder logic control programs comprised of such programmable controller instructions.

Although ladder logic control programs have application in operating a wide variety of industrial equipment, many machines have defined states with specific events indicating when a transition should occur from one state to another. This equipment can be governed by a sequencer type controller such as those described in U.S. Pat. Nos. 3,974,484 and 5,042,002. This latter type of controller enables malfunctions of the equipment to be readily diagnosed as a record is kept of the state in which the malfunction occurred and the events that lead to the problem.

Heretofore sequencer type controllers required the user to specify the operation of the equipment in terms of states and conditions signalling when to switch states. For example, the directed sequencer instruction described in the U.S. Pat. No. 5,042,002 required that logic levels for the inputs and outputs be defined for each operating state, along with each next state to go to and the logic level change of a given input that causes a transition to that next state. Whereas control engineers are familiar with ladder diagrams and other graphical representations of machine operation, they are not accustomed to defining the operation in terms of state diagrams and converting the diagram into data tables for a sequencer controller. Thus engineers had to learn an entirely different way of defining machine operation in order to use sequencer controllers. It is desirable to facilitate the definition of the functions of a machine in terms of operating states.

SUMMARY OF THE INVENTION

A programmable controller has a processor which executes instructions of a stored control program and includes an instruction that invokes the execution of a directed sequencer program. The execution of the control program examines the status of input devices connected to the controller and operates output devices and actuators that also are connected to the controller in accordance with the condition of selected input devices.

A memory of the programmable controller stores data for the directed sequencer program which defines the operation of the machine as a series of control states. The data for each state includes the statuses for the output devices; a designation of one or more transitions which can occur from that state to other states; and for each such transition, a change in the status of an input device which indicates that the specific state transition should take place. The memory also includes a storage location for an indication of at which one of the states the control program is currently functioning.

A programming apparatus is provided for a user of the programmable controller to enter the data for the directed sequencer program. That apparatus includes a means for a user to create a behavior profile depicting the desired operation of the machine. The behavior profile is divided into a plurality of regions each corresponding to one of a plurality of operational positions of the machine. The apparatus enables the user to identify the actuators on the machine and specify the status for each actuator when the machine is operating in each of the plurality of operational positions. The user also specifies inputs at which signals are received that specify an occurrence of an associated event, and specifies an output that is energized when the machine is at a designated operational position.

A complier in the programming apparatus utilizes the aforementioned information about the machine operation to produce a file of data that is readable by the sequencer program. Specifically the compiler generates a stationary state sub-file for each operational position which sub-file contains data defining the operation of the machine when the machine is stopped in one of the positions. Additional moving state sub-files are generated to contain data defining the operation of the machine as it moves through each of the operational positions. When the machine is able to move through an operational position in one of several directions, a separate moving state sub-file is generated to define the movement in each direction. Preferably a fault state sub-file is generated to define the operation of the programmable control when the machine malfunctions.

An object of the present invention is to provide a mechanism by which a user of a programmable controller is able configure the function of a directed sequencer instruction in a control program. In particular, the mechanism facilitates the generation of the data file which defines the directed sequencer function in each of a plurality of operational states.

Another object of the present invention is to allow the user to define the operation of the machine in terms of a conventional type behavior profile diagram and specify actuators and input devices of the machine that are to be used in executing the sequencer instruction.

A further object of the present invention is to provide a compiler apparatus which converts the information about the behavior profile, actuators and input devices into a file of data which is readable by software in the programmable controller that carries out the directed sequencer instruction.

BRIEF DESCRIPTION OF THE DRAWINGS

FIG. 1 is a diagram of a linear axis machine that is operated by a programmable controller according to the present invention;

FIG. 2 is block diagram of the programming terminal in FIG. 1;

FIG. 7 represents a file of control data that is used by a conventional sequencer program executed by the programmable controller;

FIG. 8 illustrates a group of data that defines one of the operating states and which is used by the sequencer program;

DETAILED DESCRIPTION OF THE INVENTION

Figure 3:
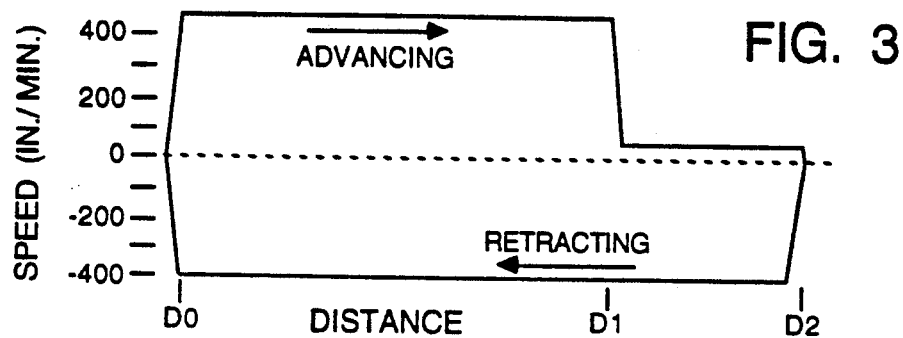
FIG. 3 is a control metaphor which depicts an exemplary cycle of operation of the linear axis machine.

With initial reference to FIG. 1, a machine generally designated as 10 has a tool 12 that is powered by a tool motor 22 to rotate a bit 24. The tool 12 is mounted on a carriage 20 that rides along a rail 18 on the base 16 of the machine. The carriage 20 is driven along a linear axis in directions 14 by the lead screw 26 that extends for the entire length above the rail 18. At one end of the lead screw 26 is a gear 28.

Gear 28 is driven by another gear 30 mounted on an output shaft 30 of a planetary transmission 32. Such transmissions are well known in the art and have two input shafts 33 and 34, with the first shaft 33 being driven by a unidirectional feed motor 36 and the second input shaft 34 driven by a bidirectional drive motor 38. The speed of the output shaft is a combination of the speeds of input shafts 33 and 34. For example, if the two input shafts 33 and 34 are both being rotated in the same direction, the speed of the output of the transmission 32 is a faster speed corresponding to the sum of the two input speeds. Similarly, if the two input shafts 33 and 34 are turning in opposite directions, the output speed of the transmission is the difference between the two input shaft speeds with the faster shaft determining the direction that the output shaft rotates. Thus the speed and direction at which the carriage 20 is moved along the linear axis of rail 18 can be controlled by independently operating the feed and drive motors 36 and 38.

A pair of conventional contactors 41 and 42 are employed to control the feed and drive motors 36 and 38, respectively. The contactors 41 and 42 operate in response to control signals from a programmable controller 40. The drive motor contactor 42 receives a pair of control signals which indicate whether the drive motor 38 is to be energized and indicate the direction of rotation. In the illustrated embodiment, the motors 36 and 38 and contactors 41 and 42 form actuators of the machine 10. Different machines utilize other types of actuators, such as hydraulic devices, which also can be operated by the programmable controller. Whereas the present invention is being described in the context of controlling motors, it has applicability to machines that employ other types of actuators.

The programmable controller 40 that has a rack 44 containing a power supply 45, a processor module 46, an output module 47 and an input module 48. The processor module 46 executes a control program defined by the user which samples input signals received via the input module 48 and based upon the status of those inputs, activates or deactivates appropriate output lines from the output module 47. As shown in FIG. 1, the output module 47 is connected to the feed and drive motor contactors 41 and 42 to turn on and off the corresponding motor 36 or 38 and in the case of drive motor 38 control the direction of rotation. Additional output lines from module 47 are connected to a set of lights 50 which indicate the status of the machine to the user.

The input module 48 receives signals from a trio of limit switches 51, 52 and 53 mounted on the base 16 of the machine 10. A dog 54 located on the carriage 20 trips the limit switches when the carriage 20 moves into different positions with respect to a workpiece 55, as is well known in the art. The first limit switch 51 is tripped by the dog when the carriage 20 is in a fully retracted position near one end of the rail 18 that is remote from workpiece 55. Similarly, the third limit switch 53 indicates when the carriage 20 has moved into a fully advanced position near the opposite end of the rail 18. The second limit switch 52 signals when the carriage has reached an intermediate position in its travel along the rail and is used to cause a change in the carriage speed, as will be described. In addition, manually operated control switches are located on a control panel 56 and are coupled to inputs of module 48 to enable the user to send operational commands to the programmable controller 40. For example, one of the manual switches on panel 56 signals when to manually advance the machine tool toward the workpiece 55 and another switch causes the machine tool to retract.

The processor module 46 is connected by cable 43 to a programming terminal 49 which the user employs to instruct the processor module how to operate the machine 10, as will be described. In addition, the terminal 49 may be utilized to display the functional status of the machine 10 during its operation.

The programming terminal 49 is a personal computer, the principal components of which are illustrated in FIG. 2. A microprocessor 60 is connected to a set of buses 61 comprising data, address and control buses. Programs for execution by the microprocessor 60 are stored in a read only memory (ROM) 62 and a random access memory (RAM) 63 is included for the storage of data. The RAM 63 is divided into different groups of storage locations one of these is provided to store a control diagram for machine 10 and another group stores data (PGM DATA) derived from that diagram for use by a sequencer program in the processor module. A keyboard 64 enables the user of the programmable controller to enter data, and a monitor 65 is provided as a device for displaying information to the user. Data and programs also can be stored on a floppy disk drive 66 or a hard disk 67. A serial I/O interface circuit 68 couples the programming terminal 49 to the processor module 46 by cable 43. The operation of the programming terminal 49 will be described subsequently.

Referring once again to FIG. 1, a typical machining cycle may involve advancing tool 12 at a relatively high speed until the bit 24 is relatively close to the workpiece 55. At that point, the speed of advancement is reduced to a level at which the bit 24 can shape the workpiece. This lower speed of advancement continues until the completion of the shaping process, such as reaching the bottom of a hole being drilled by bit 24. At that time, the bit will be retracted from engagement with the workpiece 55 into a fully retracted position from which the cycle had commenced.

This exemplary machine cycle is graphically depicted by a conventional control metaphor illustrated in FIG. 3. The abscissa of the metaphor represents the distance that the carriage 20 and machine tool 12 travel along the rail 18 and the ordinate represents the speed of the travel with the zero speed access represented by a dashed line. Locations on the metaphor above the zero speed axis designate the carriage advancing toward the workpiece 55 (left to right), whereas locations on the metaphor below the zero speed axis have a negative speed and denote retracting the carriage 20 in a leftward direction. As can be seen from the metaphor, the carriage 20 advances at a relatively high speed toward the workpiece 55 from the retracted position at approximately distance D0 until it reaches distance D1 at which point the speed of advancement decreases significantly. At distance D2, the shaping of the workpiece is completed, and the carriage 20 stops until it is to be retracted. The retraction occurs at a relatively fast uniform speed until the carriage has reached the fully retracted position at distance D0 and coasts to a stop.

The control metaphor illustrated in FIG. 3 is well understood and conventionally used by control engineers to describe motion along a linear axis, such as rail 18. However, it is not readily apparent to control engineers how to describe this machining cycle in terms of a series of states for a directed sequencer instruction of a control program. Although one will immediately recognize that there are high and low speed advancing operating modes and a retracting mode, all the states of the control process are not readily apparent from this description of the machining cycle. Therefore, although control engineers are accustomed to depicting linear motion using this type of control metaphor, they are unaccustomed to depicting linear machine cycles in terms of operational states.

The improved programmable controller system allows the user to configure a directed sequencer instruction using a conventional metaphor with a programming apparatus converting the metaphor information into a conventional data file for a directed sequencer program to execute.

The machine 10 is controlled by the programmable controller 40 executing a directed sequencer firmware program that is invoked by an instruction in the user's control program. The directed sequencer instruction and program are described in U.S. Pat. No. 5,042,002 entitled "Programmable Controller With a Directed Sequencer," which description is incorporated herein by reference. In order to facilitate programming of the sequencer program for the particular machine being controlled, program editor software resides in the programming terminal 49 and is executed by the microprocessor 60. Whereas conventional program editor software allows the user to draw a ladder diagram for that type of control program, the present program editor software also allows the user to graphically construct a linear axis control metaphor on the programming terminal monitor 65.

Figure 4:
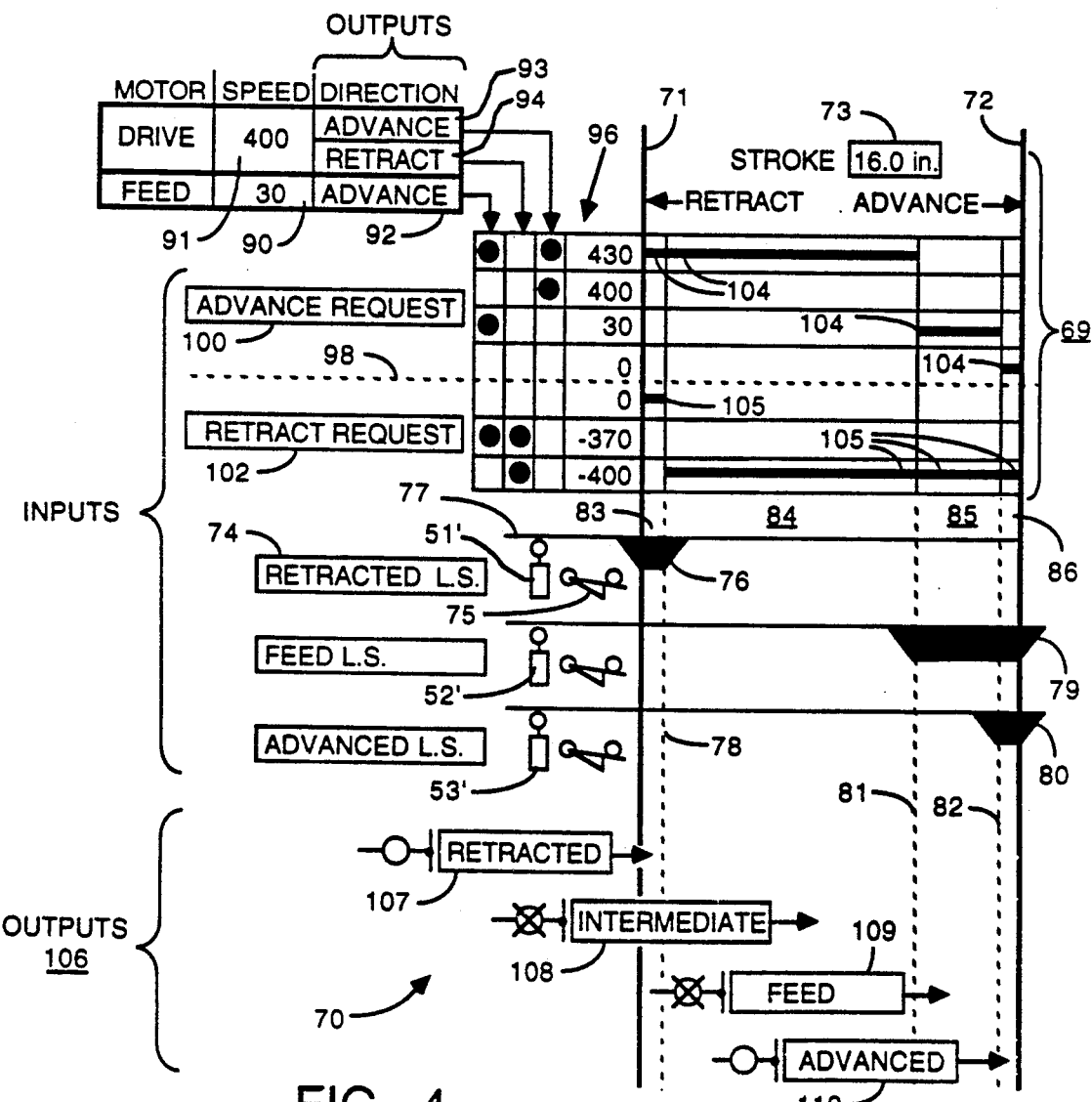
FIG. 4 is a control diagram which the user of the programmable controller creates to define the operation of the linear axis machine.
Figure 5:
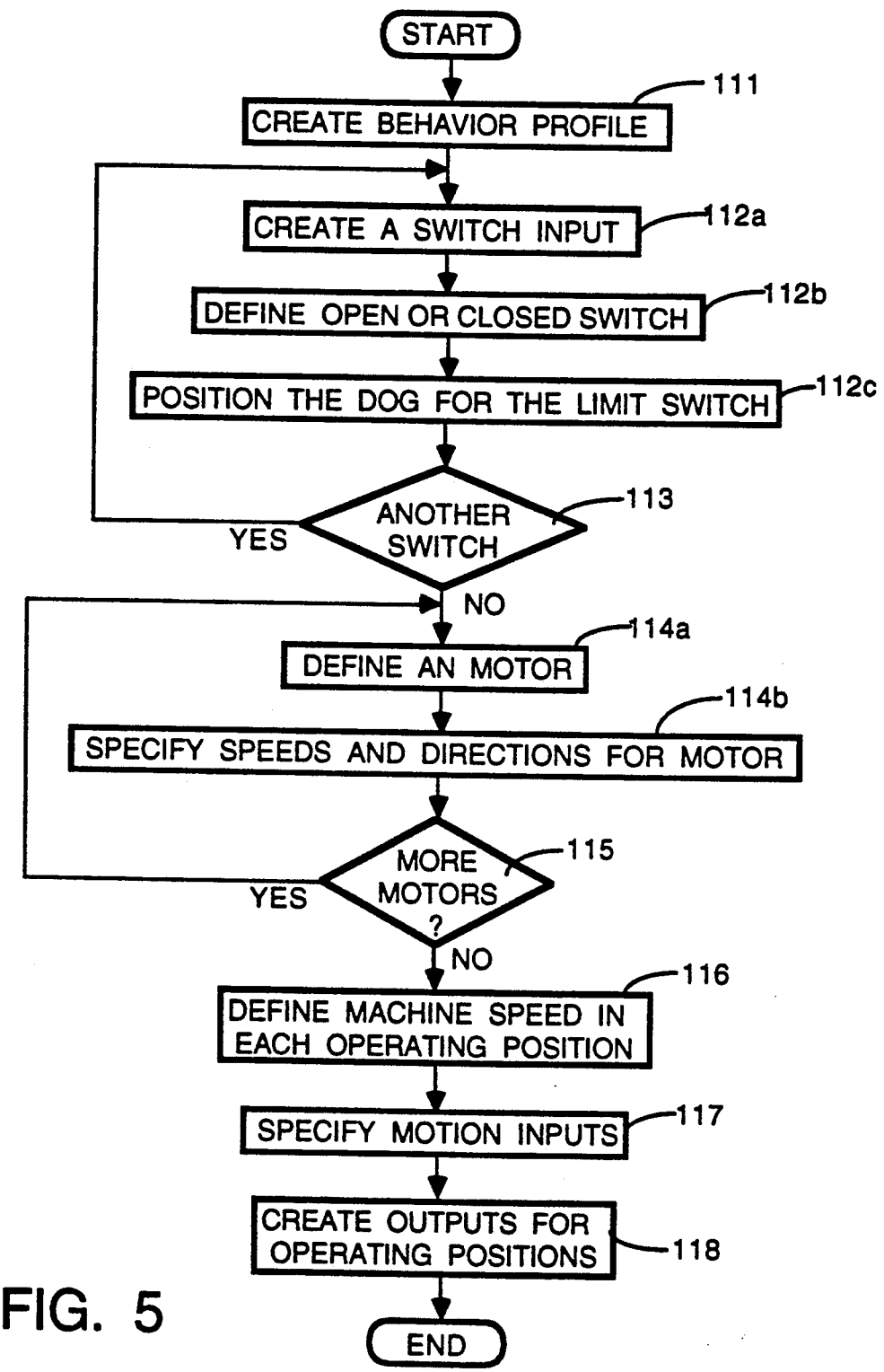
FIG. 5 is a flowchart of the process by which program editor software in the programming terminal of FIG. 1 enables the user to create the control diagram.

FIG. 4 depicts a control diagram 70 for the linear axis metaphor shown in FIG. 3, as displayed on the programming terminal monitor 65, along with additional information required to derive state data for a directed sequencer program. A flow chart of the process by which the user creates the control diagram is depicted in FIG. 5 by interacting with the programming terminal 49 while terminal executes the program editor software. Initially at process step 111, the user constructs a behavior profile 69 that is similar to the control metaphor for the desired machine cycle. The behavior profile 69 is illustrated in the upper right portion of the display in FIG. 4 between lines 71 and 72 representing the extremes of the linear motion. The remainder of the display designate "physical attributes" of the machine control cycle, which attributes constitute the input and output signals required to operate the machine according to the behavior profile.

At the outset of defining the operation of the machine a blank behavior profile is displayed with only the outer lines 71 and 72 that correspond to the extremes of the linear movement of the carriage 20. The "RETRACT" and ADVANCE" legends appear at the top of the profile along with a box 73 in which, the user enters the length of the machine stroke, i.e. the distance between postions D0 and D2. In the present example the stroke distance is 16.0 inches.

At step 112a, the user then selects a menu item on the terminal screen to define one of the three limit switches 51-53, for example switch 51 for the fully retracted position of the carriage. Upon that selection, a limit symbol 51' is displayed on monitor 65 and box 74 appears to the left of the symbol 51' within which the user enters the switch name, such as RETRACTED L.S. A schematic representation 75 of the limit switch appears adjacent to its symbol 51' to indicate whether the limit switch contacts close or open when struck, or tripped, by the carriage dog 54. A dog symbol 76 also appears on a horizontal line 77 which represents the linear axis of movement. One end of the dog symbol 76 initially abuts the LEFT vertical line 71 and another vertical line 78 appears at the other end of the dog symbol.

The graphical representation of the limit switch 51 indicates when the limit switch is sending an active input signal to the programmable controller 40 with respect to the positions of travel by carriage 20. At step 112b, the user indicates whether the switch is normally opened or closed. This is accomplished by using a mouse or the keys on keyboard 64 to place the cursor over the schematic symbol 75 and press button to toggle the symbol open or closed. In a similar manner at step 112c, the user "grabs" the dog symbol 76 to position the symbol along line 77 to indicate positions on the axis where the carriage dog 54 trips the limit switch 51. The length of the dog symbol 76 can be changed by using the cursor to grab one end of the symbol and stretch or contract the dog symbol. As the position and length of the dog symbol changes, so does the position of the vertical line 78 which indicates the location along the linear axis at which the dog engages and disengages the corresponding limit switch 51. The dog symbols 79 and 80 for the feed and advanced limit switches 52 and 53 also are positioned on the control diagram in this manner by the user repeatedly selecting the limit switch menu item at step 113. Defining the other limit switches also creates additional vertical lines 81 and 82 on the control diagram 70.

The definition of the three limit switches 51', 52' and 53' divides the stroke length into four segments referred to as "positions" 83, 84, 85, and 86. The location and length of the dog symbols 76, 79 and 80 designate in which of these positions 83–86 the corresponding limit switch will be tripped by the carriage dog 54. In the present example, the retracted limit switch 51 is tripped by the dog 54 when the carriage 20 is stopped in the retracted position 83, at the extreme left of rail 18. The feed limit switch 52 is actuated when the carriage 20 is in position 85 between distances D1 and D2, or is stopped in advanced position 86. The advanced limit switch 54 is tripped by the dog 53 only when the carriage 52 is at the advanced position 86.

As the limit switches are employed to signal when a change in carriage speed should occur, the operational positions 83, 84, 85, and 86 relate to different sections of the control metaphor in FIG. 3. Specifically, retracted position 83 corresponds to the stopped position at distance D0, and position 84 corresponds to the carriage 20 moving between distances D0 and D1. Similarly, position 85 corresponds to when the bit 24 is feeding into the workpiece 55 between distances D1 and D2, whereas position 86 corresponds to the fully advanced position when the carriage is stopped at distance D2. The terms "position" and operational position," as used herein, refer to physical locations at which the machine has different operating characteristics, for example movement speed and direction. A position may be a single physical location or a region of physical locations, such as the region between distances D1 and D2.

After defining the signals for the three limit switches 51–53, the user then specifies the number of actuators (motors) which are employed to drive the carriage 20. A separate block 88a or 88b is created each time the user selects the define motor menu item of the program editor software at step 114a. This enables the user to specify the number of motors, in this case two for the drive motor 38 and the feed motor 36. Each block 88a and 88b is subdivided into three boxes for motor name, speed and direction. The blocks 88a and 88b may be subdivided further depending upon the types of the motor, i.e. . . . single speed-single direction (as the feed motor 36), single speed-two direction (as the drive motor 38), two speed-single direction, or two speed-two direction. In the present example, the feed motor 36 is denoted by block 88a with a single speed box 90 and a single direction box 92. However, the drive motor 38 is a single speed-two direction device and thus its block 88b has a single speed box 91 and two direction boxes 93 and 94. At step 114b, the user enters the speed of the feed motor in box 90 and designates whether the direction of the motor is advancing or retracting. The editor software loops through steps 114a–115 until information has been provided for both motors 36 and 38.

Each time a motor block 88a or 88b is added, removed or edited, the graphical editor software forms and displays a matrix 96. That matrix has a column for every direction and/or speed coil of the contractors 41 and 42 for the motors and a line which corresponds to all of the possible combinations of motor speeds going toward and away from the workpiece. The exemplary, combination of motors can advance the carriage 20 toward the workpiece 55 at either 430 inches per minute when both motors 36 and 38 are activated and rotating in the advance direction, 400 inches per minute when only the drive motor 38 is activated in the advance direction, or 30 inches per minute when only the feed motor 36 is activated. Similarly, the motors can be used to retract the carriage 20 from the workpiece 55 at either 400 inches per minute when the drive motor alone is being activated in the retract (negative) direction of 370 inches per minute when the drive motor is activated in the retract direction and the feed motor is activated. Since the feed motor 36 can only be activated in the advance direction, its input to the gear box 32 of 30 inches per minute will be subtracted from the 400 inches per minute retraction input provided by the drive motor 38 to produce a net retraction speed of 370 inches per minute in the negative direction, away from the workpiece 55. A black dot in various matrix locations indicates which of the motors are energized and their direction to produce the speed listed in the right column of the matrix 96.

When the matrix 96 is formed separate horizontal bars 104 and 105 are created across the behavior profile 69 above and below the zero speed axis 98. Each of the horizontal bars 104 and 105 is formed by individual segments within each of the operational positions 83–86. At step 116, the user grabs the segments of the horizontal bars 104–105 in the behavior profile 69 and positions the segments vertically to indicate the advancing and retracting speed at which the carriage 20 is to move within each of the positions 83–86. For example, when the ADVANCE REQUEST is received, the carriage 20 is to move from the retracted position 83 through the intermediate position 84 at a speed of 430 inches per minute. Backing through the matrix 96, one can see that this speed is achieved by activating both the feed and drive motors 36 and 38 in the work direction. When the advancing carriage reaches the feed position 85 between distances D1 and D2, the speed is reduced to 30 inches per minute by activating only the feed motor 36 as indicated by the segments of bar 104. Upon the carriage 20 reaching the advanced position 86 at distance D2, the speed goes to zero by stopping both motors 36 and 38. Thus, the portion of the behavior profile 69 above the zero speed axis 98 corresponds to moving the carriage toward the workpiece 55. A similar representation in FIG. 4 is given for the speed of the carriage away from the workpiece 55 by locating the segments of horizontal bar 105.

Referring still to FIGS. 4 and 5, the user then provides the names of separate inputs which indicate when the carriage 20 is to advance toward the workpiece and when it is to retract. These names are placed into boxes 100 and 102 as inputs to be used by the directed sequencer program at step 117. In the example these inputs have been named simply ADVANCE REQUEST and RETRACT REQUEST.

Next the user is afforded an opportunity at step 118 to define output signals 106 which are generated when the carriage 20 is within the different operational positions 83–86. Graphic symbols 107–110 are provided for each position region with a box within which the user assigns a name to the output. An arrow leads from the box to the center of the particular carriage position. The X through output coil symbols 108 and 109 indicates that an output signal is not required when the carriage 20 is within the corresponding positions 84 and 85. Thus output signals are provided in the example only by symbols 107 and 110 when the carriage 20 is at the end positions 83 and 86 of its travel.

As the user creates the control diagram 70, the program editor software stores data from the diagram into the memory of the programming terminal 49. After the graphical control diagram 70 has been completed, the user enters a command into the programming terminal 49 which causes a sequencer compiler program to be executed. This program converts the graphical control diagram data into a file of operational state data that is readable by the directed sequencer program which the programmable controller processor module 46 executes to control the machine 10.

Figure 6:
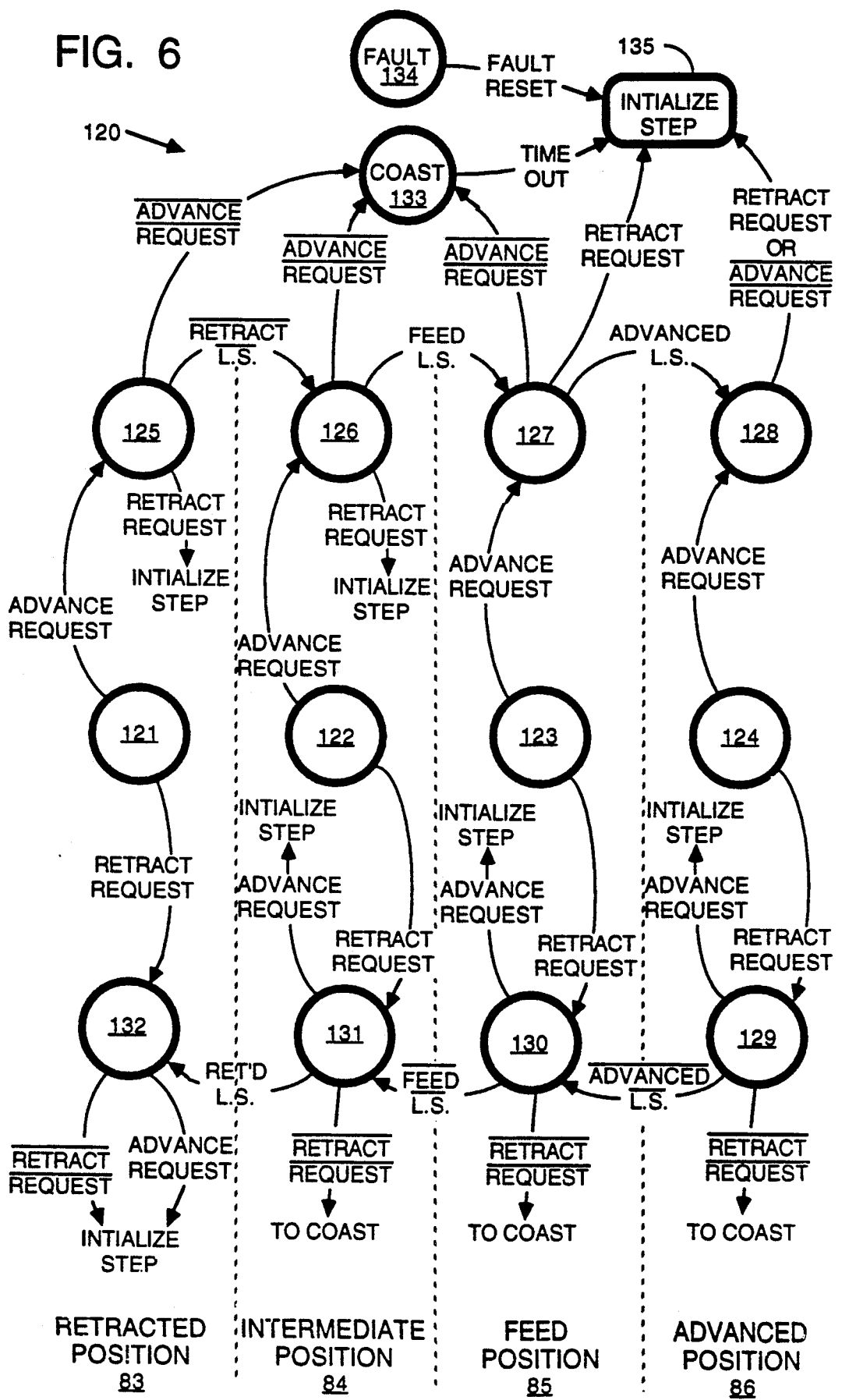
FIG. 6 is a state diagram for a directed sequencer program that is produced from the control diagram in FIG. 4.

The directed sequencer program operates as a state machine in controlling the machine 10 and the corresponding state diagram 120 is shown in FIG. 6. Although this state diagram is not generated by the compilation process, a description of the state diagram will be helpful in understanding that process. As is readily apparent, the state diagram is much more complicated than the conventional metaphor illustrated in FIG. 3. The state diagram 120 has fourteen states 121–135 with lines between states indicating legitimate transitions that may occur between states. The legends along the transition lines designate the input signal change that causes the associated transition. The dashed vertical lines through the state diagram separate the states which occur when the carriage 20 is in each of the operational positions 83–86.

Since the carriage 20 can be stopped within any of these positions, a separate stationary state 121–124 is defined for each position. When an ADVANCE REQUEST is received, the carriage 20 will move from a stationary state to one of the advancing states 125–128 depending upon the position of the carriage. Similarly, since a RETRACT REQUEST can go active when the carriage is in any of the stationary states 121–124, a corresponding retracting state 129–132 exists for each position. If the ADVANCE REQUEST goes inactive when the carriage is operating in advancing states 125–127 or if the RETRACT REQUEST goes inactive when the carriage is operating in retracting states 129–131, the power will be removed from the motors and the system will go into a coast state 133.

Furthermore, a fault condition can occur in states 121–132 which results in a transition to a fault state 134. Note that in order to simplify the illustration of the state diagram 120, transition lines that exist between states 121–132 and the fault state 134 are not shown. From the coast state 133, a transition occurs after a given period of time to the initialize step 135 of the conventional directed sequencer program. A transition also occurs to the initialize step 135 from the fault state 134 based upon a fault reset signal input. A transition occurs directly to the initialize step when the RETRACT REQUEST goes active in an advancing state or when the ADVANCE REQUEST goes active in a retracting state. In that initialize step, the expected input conditions for the states of the state diagram are examined to determine in which state the machine is currently operating. When that state is found, the directed sequencer program enters that state from the initialize step 135. For example, the only way to enter a stationary state 121–124 is from the initialize step of the sequencer program.

As is described in U.S. Pat. No. 5,042,002, information about the state diagram 120 is stored in the memory of the programmable controller 40 as a pair of data files 140 and 160. These files are a control file containing information, which defines the overall operation of the directed sequencer program, and a state description file that is divided into sub-files containing data which defines the operation of the machine in each state. The directed sequencer program utilizes the control and state description sub-files in the course of executing the directed sequencer instruction in the user's control program, as described in the patent cited immediately above.

With reference to FIG. 7, the directed sequencer control file 140 has a first data block 141 that contains control and status bits which among other things indicate whether various processing options are enabled or disabled. The length of the state description file and the number of sequence states are stored in the next two data blocks 142 and 143 respectively. These data enable the software which performs the directed sequencer function to locate other data within the control file. The fourth data block 144 of the control file 140 is used to store the numerical designation of the current state of the control sequence and the fifth data block 145 stores a designation of the previous state. The previous state information is employed to provide a history of the control process in the event of a malfunction.

The next two control file data blocks 146 and 147 contain the status of the specific programmable controller inputs and outputs which have been selected for use by the directed sequencer instruction. Each block is 32 bits wide and together represent an I/O image sub-table for the directed sequencer with each bit corresponding to the state of a selected input or output of the programmable controller. For the machine 10 in FIG. 1, the selected inputs correspond to the inputs for the limit switches 51–53 and memory locations for the motion requests 100 and 102. The outputs in the example correspond to the indicator lights 50 and the two carriage motors 36 and 38. The data bits representing the status of each selected I/O device are copied (or mapped) between the sequencer control file 140 and the main I/O image table in the memory of the processor module 46. The mapped input block 146 is updated at the start of the execution of the directed sequencer instruction in the ladder logic control program. The addresses of each selected I/O device status bits in the main I/O image are sequentially stored in data block 152 of the control file 140. After the evaluation of whether a sequence state transition should occur, the mapped output bits in file block 147 are copied into the corresponding locations in the main output image table in the processor module memory. For this purpose the corresponding addresses for output image table are stored in data block 153 of the sequencer control file 140.

Each state of the control sequence has a time limit so that if the sequencer program remains in the same state for more than the specified interval, a state transition will occur regardless of the status of the inputs. The timer control data block 148 contains the preset and accumulated timer values and a timer enable flag for the currently active state. The use of this timer data will be described subsequently.

One of the other features of the directed sequencer is the capability of generating error messages via the communication section of the processor module 46. A message control data block 149 in the control file 140 contains address and other data to enable the error message to be sent to a receiving device, such as the programming terminal 49. The actual message is stored in control file block 150. Finally, a group of words in data block 151 is assigned for internal usage as temporary storage locations and as a message buffer when several messages are to be sent.

FIG. 8 depicts one of the state sub-files 160 in the state description file. The first word 161 in the sub-file contains a unique state number that serves as a check mechanism to insure that the proper state sub-file has been accessed. The second sub-file entry 162 contains data bits which indicate desired logic levels for the inputs that must exist in order for the machine 10 to operate in that state, as will be described. A transition between states can occur when a specified input bit makes a high-to-low or a low-to-high logic level transition, as occurs when a limit switch opens or closes, for example. This entry 162 may contain logic level data for 8, 16 or 32 input bits depending on the number of inputs required for operating the machine 10. However, not all of the inputs are used in determining whether a transition from a particular state should occur. For example, because entry into the advancing state 125 does not occur during a fault condition, the fault reset input bit is not to be used to determine whether entry into state 125 from another state should be allowed. Therefore, an input mask is stored in the next sub-file entry 163 and is used to filter out the fault reset input bit when determining if a state transition should be made. The mask also filters out other input bits to be ignored.

State sub-file entry 164 identifies the outputs that are not to be changed when entering this state, i.e. which outputs are to remain at their previous logic levels. Designations of the logic levels that the other outputs are to assume in this state are stored in sub-file entry 165.

The directed sequencer program has a timer that times out when the machine operation remains in a state for an unusually long period of time. That period is specified for each state by a value that is retained in a two word sub-file entry 166. A byte 167 identifies the next state to be executed when state timer expires and the other byte 168 contains control and status bits for this state.

The remainder 169 of the state sub-file contains a look-up table for determining the desired next state based on an individual input bit transition. Depending upon the number of inputs selected for the directed sequencer function, there are 8, 16 or 32 entries in the look-up table (one entry for each input). Each of these byte entries indicates the number of the next state to execute upon a change of the associated input from the logic level specified in entry 162. As mentioned previously, not every input device is used to allow entry into the state. When that is the case, the input may not be used to signal a state transition in which case its corresponding next state entry in the look up table will be zero.

After the user finishes creating the control diagram 70 (FIG. 4), the microprocessor 60 in programming terminal 49 executes a sequencer compiler program to convert the graphical control diagram into the control and state description files that are readable by the directed sequencer program in the programmable controller 40. This sequencer compiler program is depicted in the flowcharts of FIGS. 9A, 9B and 10-16.

Figure 9A:
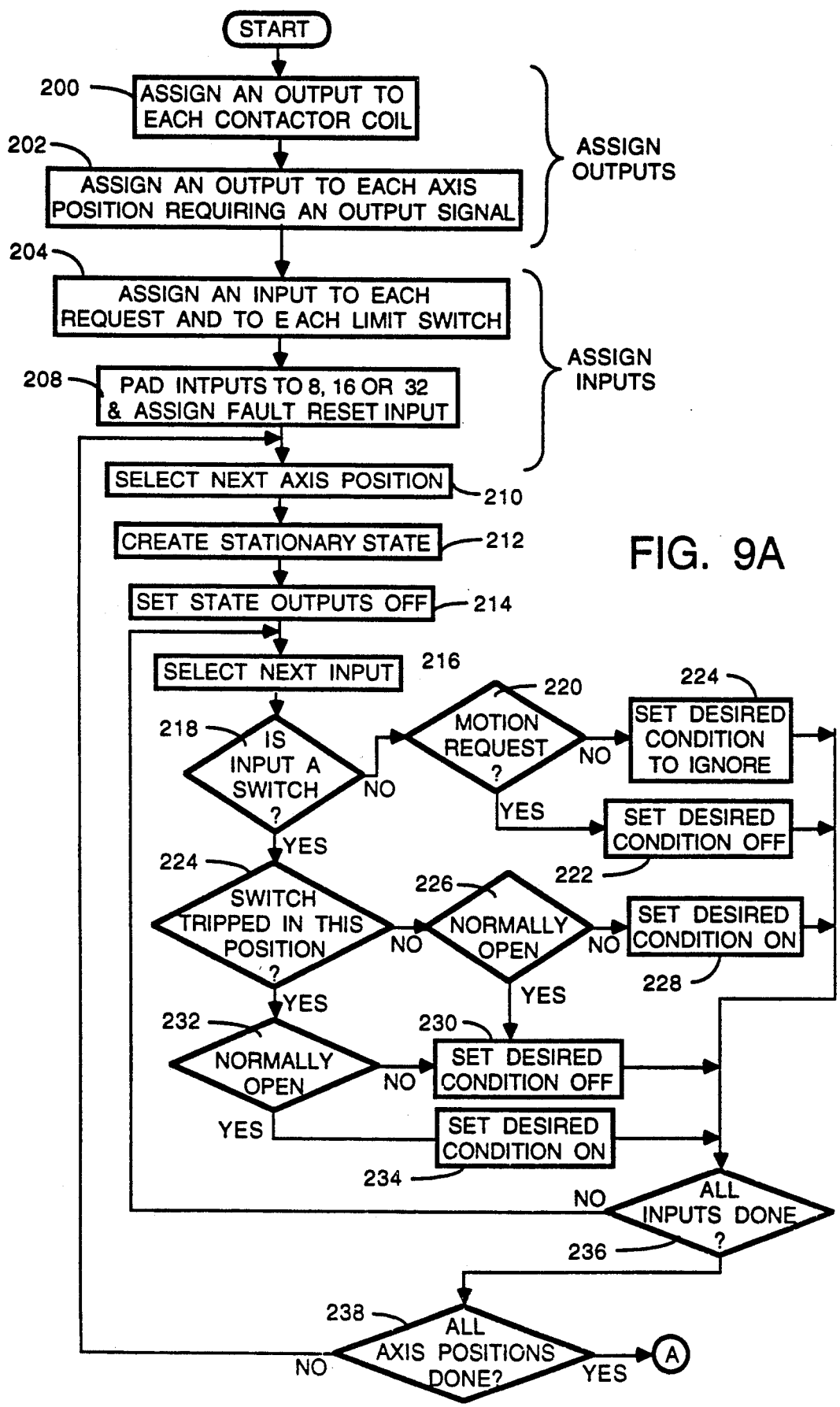
FIGS. 9A-9B form a flowchart of the main program for converting the control diagram into data files for the sequencer program.

With initial reference to FIG. 9A, the compilation process begins by assigning outputs for the carriage motors 36 and 38 and the indicator lights 50 which are to be controlled during the execution of the directed sequencer program. At step 200, one output is assigned to turn on and off the feed motor 36 and two outputs are assigned to drive motor 38 to operate the motor in the advancing and retracting directions. In assigning these outputs the computer program reads data relating to the blocks 88a and 88b on the control diagram to determine the number of motors and the number of outputs needed for each motor. Next at step 202, an output is assigned to each operational position 83-86 that has been designated in the control diagram 70 as requiring an output signal. As indicated in FIG. 4, when the carriage 20 is in the retracted position 83 or the advanced position 86, output 107 or 110, respectively, is to be energized. In the intermediate position 84 or the feed position 85, outputs are not required as indicated by the X through the associated output symbols 108 and 109 in the diagram. Thus, a retracted output and an advanced output are assigned at this compilation step by reading the control diagram data for symbols 107 and 110.

The compiler program execution then advances to step 204 where an input is assigned to each motion request 100 and 102 and to each limit switch 51-53. The inputs for the ADVANCE REQUEST 100 and RETRACT REQUEST 102 typically are memory locations within the programmable controller processor 46 containing data bits that are set or reset by other instructions of the ladder logic program that contains the directed sequencer instruction. For example, a pair of ladder logic instructions read the manual advance and retract switches on control panel 56 and store a bit in the I/O data table in the processor module memory which indicates whether the switch is opened or closed. In assigning inputs to the limit switches 51-53, the compiler program finds the number of switches by locating how many symbols 51'-53' have been placed in the control diagram 70. The names assigned to the switches is used to keep track of each switch and its associated input.

A reset input is added at step 208 to provide a mechanism by which the directed sequencer can be reset in the event of a fault condition. The directed sequencer program described in U.S. Pat. No. 5,042,002 is designed to manipulate either 8, 16 or 32 inputs, which one of these quantities of inputs to be used for the present control program is chosen at step 208 depending upon the number of inputs previously assigned. A mask then is created to ignore unassigned inputs in the selected quantity.

The sequencer compiler then defines the operating states for the directed sequencer program. As each state is created, it is assigned a unique number and a state sub-file 160 is established for that state's data. The process begins by creating a stationary state 121, 122, 123 or 124 for each of the four positions 83-86 of the movement stroke. To do so one of the four operational positions 83-86 is selected at step 210 by the compiler scanning the behavior profile 69 for the number of regions between vertical lines 71-72 and the stationary state for the selected position is created at step 212. All of the outputs in sub-file entry 165 for the stationary state initially are set to off at step 214. Because it is normal to wait indefinitely in a stationary state for a motion request, a value is placed in entry 166 to disable the state timer for the stationary state.

Then, an expected condition is defined for each of the previously assigned inputs and the condition is stored in sub-file entry 162 along with a mask in entry 163. This process begins at step 216 where one of the inputs is selected and a decision is made at step 218 whether that input is a switch. Assuming that the input is not a switch, the program execution branches to step 220 where a determination is made whether the input is a motion request. If the present input is a motion request, the desired condition of the input is set to off as motion is not expected in a stationary state. Otherwise, if the input is not a switch and is not found to be a motion request at step 220, this must be a reset input and a mask bit is set at step 224 to ignore this input as it is not used to indicate when to enter the present state. The compilation process then advances to step 236.

If a decision was made at step 218 that the input was a switch, the program execution goes to step 224 where it is determined whether the input switch is tripped in the carriage position of the present stationary state. This determination is based on the location of the dog symbols 76, 79 and 80 with respect to the operational positions 83-86 shown in the control diagram in FIG. 4. For example, the retracted limit switch 51 is tripped by the dog 54 in the retracted position 83 for stationary state 121 as indicated by dog symbol 76. However, limit switch 51 is not tripped in the other stationary states 122-124. If the selected input switch is not tripped in the present stationary state, the program execution advances to step 226 where an inspection is made of the contact icon 75 associated with the switch to determine whether the switch is wired normally open. If so, the desired condition for this input in the state sub-file entry 162 is set to an OFF logic level at step 230. Otherwise, in the case of a normally closed switch, the desired condition of the input in sub-file entry 162 is set to an ON logic level at step 228.

If at step 224 the input switch is tripped in the associated carriage position, the compilation advances to step 232 where a determination is made from the icon 75 associated with the switch whether it is normally open. If the switch is normally open, its desired input condition in sub-file entry 162 is set to ON at step 234; otherwise, the desired input condition is set to OFF at step 230.

After a desired condition for the first input has been stored in the sequencer state sub-file 160 by steps 216-234, the compiler program determines at step 236 whether additional inputs have to be processed for this stationary state. If such inputs remain, the program execution returns to step 216 where the next input is selected and then processed by the other steps. The compilation continues looping through the input processing steps 216-236 until every input has been defined for the current state. Once that has been accomplished, the compiler program execution advances from step 236 to step 238 where a determination is made whether a stationary state for each operational positions 83-86 has been created. Eventually, the program execution will advance from step 238 to step 240 on FIG. 9B.

At this point, the state sub-files 160 for all of the stationary states 121-124 have been created, but the data have not been placed into the state sub-files 160 to configure these states. The configuration of a state determines the status for each output in that state and the specification of transitions to one or more other states. In the process of configuring one state, a new state will be created when a determination is made that a transition should occur to a state which has yet to be created. Each of these newly created states will be configured in turn.

Figure 9B:
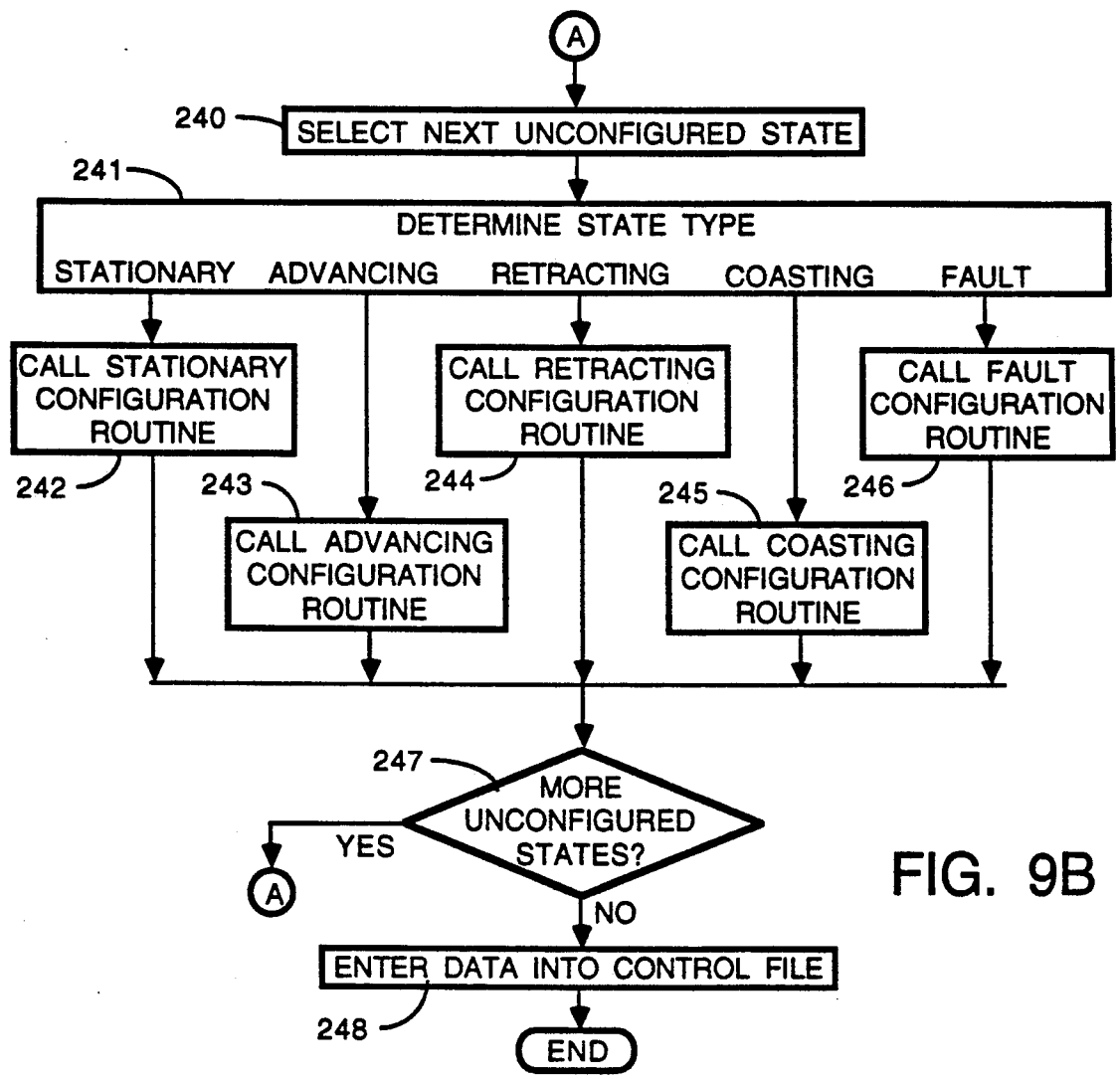

The state configuration process begins at step 240 on FIG. 9B where one of the unconfigured states is selected and the type of the selected state is determined at step 241. The various types of states are stationary, advancing, retracting, coasting and fault. Each time the compiler program creates a state a numerical designation of its type is assigned temporarily to its state sub-file for this purpose. Once the type of the selected state has been determined, the program execution branches to a separate step 242, 243, 244, 245 or 246 to call a configuration routine for that type of state. The configuration process continues to loop through steps 240-247 until all of the states have been created and configured. The result of the configuration is a sequencer sub-file 160 for each state of the control process. Then at step 248, the compilation process fills in the data required by the sequencer control file 140 described previously with respect to FIG. 7. The execution of the compiler program then terminates.

Figure 10:
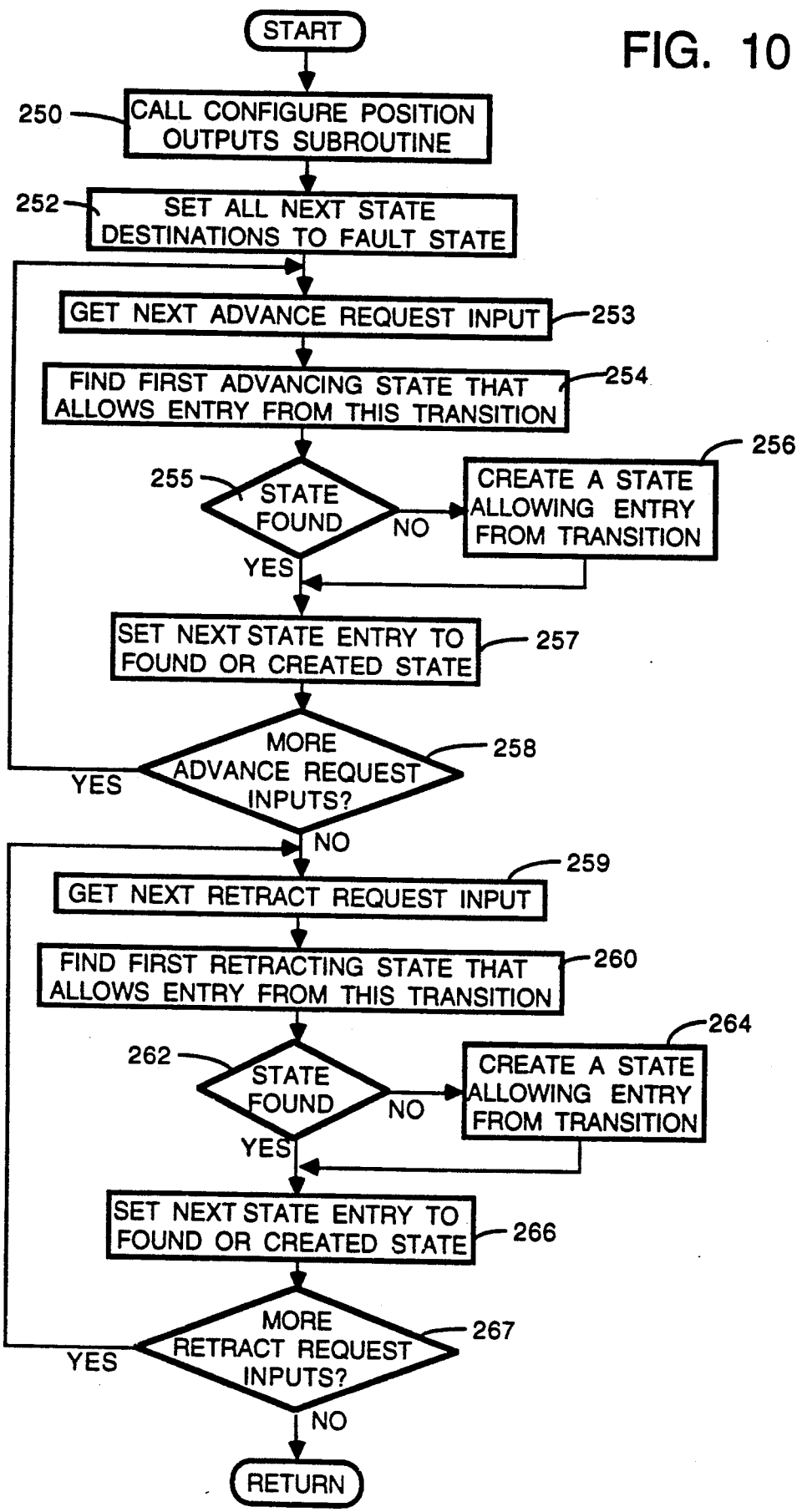
FIGS. 10-14 are flowcharts of state configuration routines that are called by the main program.

The configuration routine for the stationary states is represented by the flowchart of FIG. 10. This routine commences by calling a position output configuration subroutine at step 250. This subroutine is depicted by the flowchart in FIG. 15 and begins at step 400 where a position output 107, 108, 109 or 110 is selected. Then at step 402, the software inquires whether this position output is to be used for the present state based upon where the arrow for the output symbol points on the control diagram 70. This is accomplished by checking the location of the tip of the arrow on the monitor to find whether it is within the operating position 83-86 for the present state. If the output is to be used in this state, a corresponding bit in the state sub-file entry 165 is set to an ON logic level at step 406, otherwise the bit is set to the OFF logic level at step 404. The compiler program then inquires whether additional position outputs remain to be configured at step 408, in which case the program jumps back to step 400. Eventually when all of the position outputs have been configured for the state presently being processed, the subroutine returns.

Upon returning from the subroutine, the main program advances to step 252 on FIG. 10 at which all of the next state entries 169 are initialized to the fault state 134. At this point the fault state 134 is created and its state number is stored in the next state entries. The fault state will be configured later.

The compilation process then progresses to a section at which each of the inputs is inspected to determine whether the directed sequencer uses that input to initiate a transition from the current state to another state, and if so, which one. Specifically at step 253, an input for an advance request (e.g. request 100) is selected from the control diagram 70. For this input, an inspection is made to find an advancing state 125-128 that allows entry from the selected stationary state when the advance request input goes active. A test is made at step 255 whether such a destination advancing state was found. Initially, none of the advancing states 125-128 has been created and thus a state will not have been found at step 254. In this event, the program execution branches to step 256 where a state is created to which a transition will occur when the present advance request input is active. This step involves creating a new state sub-file in the RAM 63 of the programming terminal 49 and assigning the next available state number to that sub-file. Then at step 257, the number of the destination state is stored within the next state entry 169 associated with the advance request input of the current state's sub-file 160. A determination is made at step 258 whether additional advance request inputs remain to be processed for this stationary state. In the present example illustrated in FIG. 4, only one advance request was defined by the user, and thus the execution of the compiler program will advance from step 258 to step 259.

A similar process is performed beginning at step 259 for the retract request inputs (e.g. request 102) which were previously assigned to the selected stationary state at step 204. This section of the compiler program begins by choosing one of the retract request inputs and then finding the first retracting state 129-132 that allows entry upon a transition from the stationary state currently being processed. If such a retracting state is not found as determined at step 262, a new retracting state is created at step 264. Then at step 266, the number of the destination state is stored in the current state's sub-file 160 within the next state entry 169 associated with the retract request input. Step 267 causes the program execution to continue looping through steps 259-266 until all of the retracting request inputs have been characterized. For example, when stationary state 121 is being characterized, a retracting state 132 will be created and a transition will be defined from the stationary to the retracting states with an active RETRACT REQUEST input 102 being designated as triggering the transition. After all of these inputs have been characterized the configuration routine terminates by returning to the main program on FIG. 9B.

Figure 11:
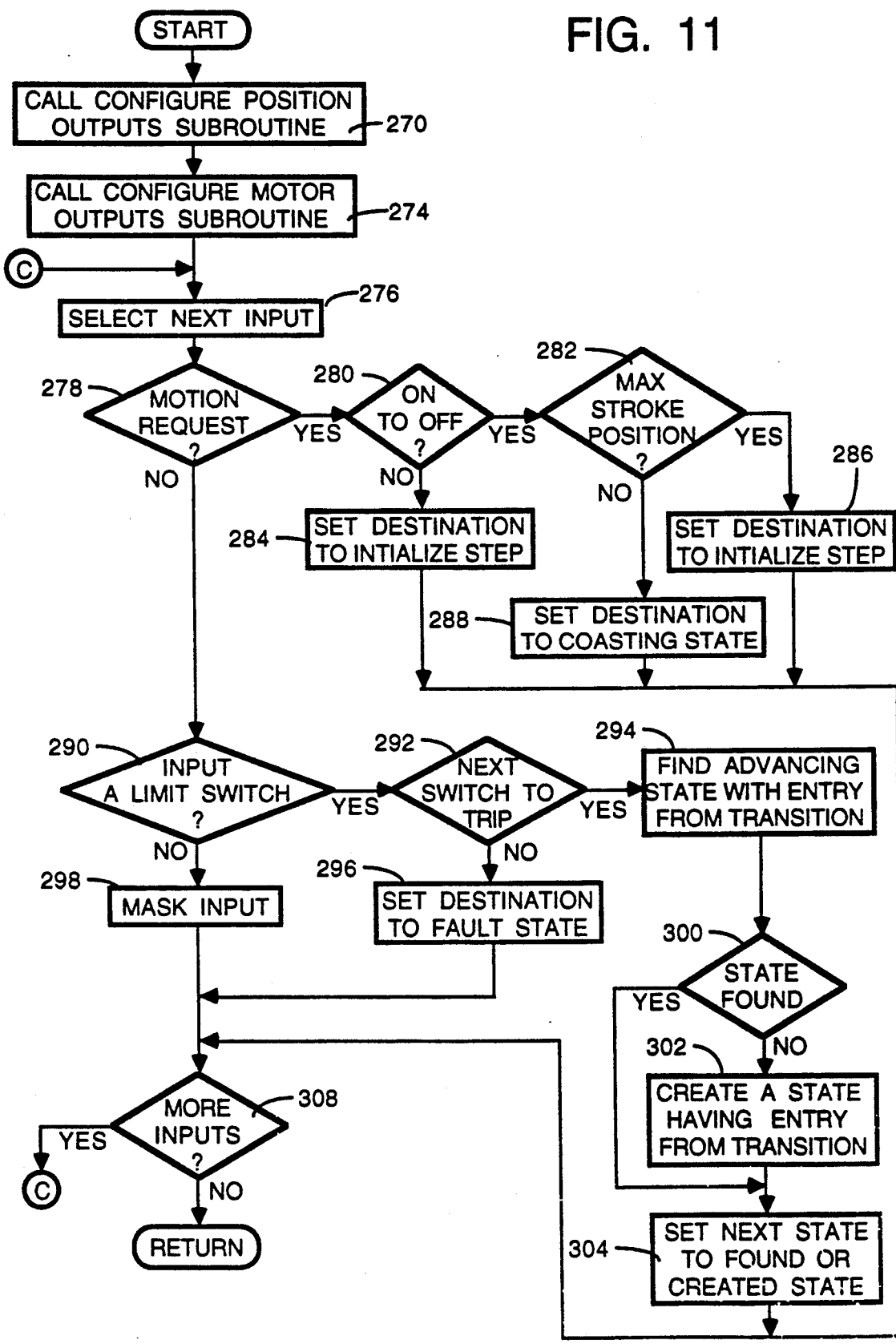

The configuration routine called at step 243 for the advancing states is represented by the flowchart of FIG. 11. This routine commences at step 270 by calling the position output configuration subroutine illustrated in FIG. 15 and previously described. This subroutine configures a value for each of the position outputs when the machine is in the advancing state currently being processed.

Figure 16:
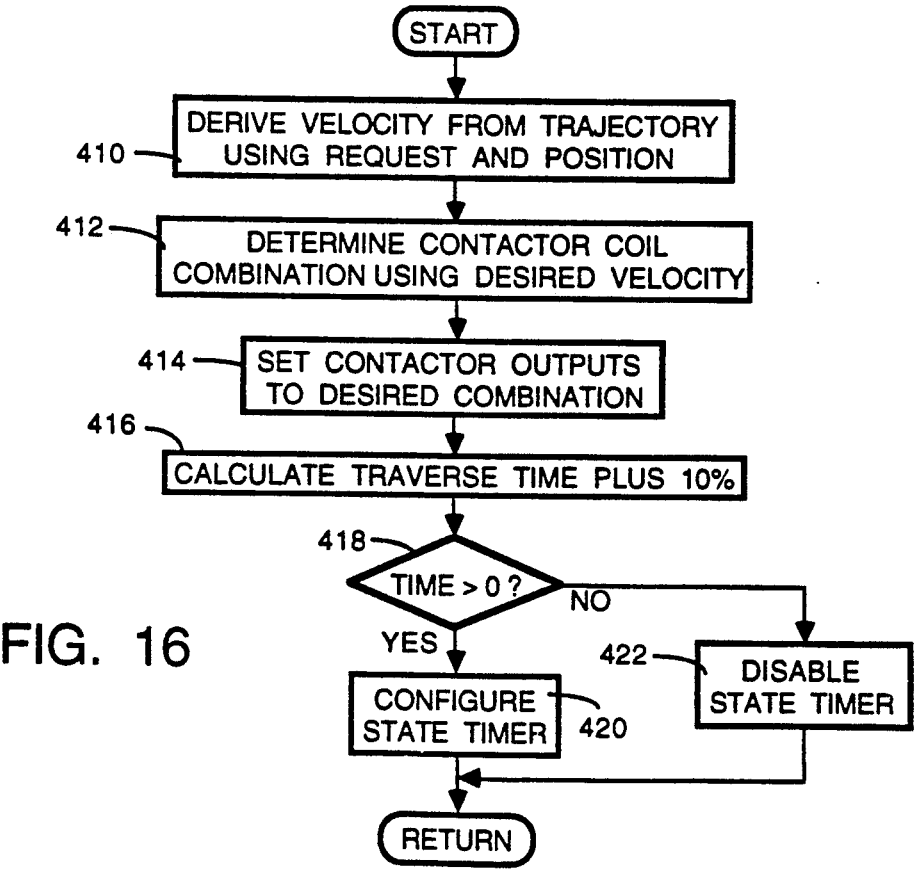

At step 274, another subroutine is called to configure the motor outputs. This subroutine is depicted by the flowchart of FIG. 16 and commences at step 410 by finding the velocity of the carriage 20 in the position that corresponds to the present advancing state by examining the data for the behavior profile 69 shown in FIG. 4. The carriage velocity along with data from the motor matrix 96 then is used at step 412 to determine the contactor coil combination to activate so that the motors 36 and 38 will produce the desired velocity. For example, in advancing states 125 and 126, the carriage 20 is to move at a velocity of 430 inches per minute as indicated by the bar 104 in the corresponding positions 83 and 84, respectively, in the behavior profile 69. The motor matrix 96 indicates that this speed requires that both motors 36 and 38 be activated in the advancing direction. In advancing state 127 for feed position 85, the velocity is 30 inches per minute and a similar analytical process shows that only the feed motor 36 needs to be activated. Advancing state 128 occurs at the end of the carriage travel when the motors 36 and 38 are to be stopped. At step 414, output bits for the motors 36 and 38 in the output entry 165 of the present state's sequencer sub-file 160 are set to logic levels that will produce the desired motor operation.

The amount of time that carriage 20 takes to move through the position for the selected state is calculated at step 416. This position traverse time is derived from the behavior profile 69 of the control diagram 70 (FIG. 4). Specifically, vertical lines 71,72,78,81 and 82, representing transitions between operational positions of the machine 10, are at known locations on the programming terminal display. The relative distances between adjacent vertical lines of the behavior profile 69 can be derived based on the number of display locations or picture elements therebetween. In the example depicted in FIG. 4, the distance between lines 78 and 81 is approximately three-quarters of the total stroke distance. The total stroke distance is designated as 16 inches in box 73 of the control diagram 70 and this value is converted from ASCII data into binary data. The microprocessor 60 uses the total stroke distance to calculate the distance of carriage travel in the intermediate position 84. In the present example this travel distance is 12 inches (three-quarters of 16 inches). The microprocessor 60 then divides the distance of travel by the velocity (12 inches divided by 430 inches per minute) to derive the nominal amount of time (0.028 minutes) during which the carriage 20 should remain in advancing state 126 for intermediate position 84. A ten percent tolerance is added to this traverse time at step 416.

A determination is made at step 418 whether the calculated traverse time is greater than zero. If so, the compiler program execution branches to step 420 where the traverse time is stored as the state timer preset entry 166 in the present advancing state sub-file 160 and the number of the fault state will be stored in the timer next state entry 167 near the end of the compilation process. During execution of control program, when the sequencer remains in the given state for longer than the preset time for the state timer, the sequencer transfers to the fault state 134. If the calculated traverse time is zero, the timer for the state is disabled at step 422 before the subroutine terminates by returning to the step (e.g. 274) from which it was called.

Referring once again to the flowchart of FIG. 11, the subroutine returns and begins executing a section of the compiling program which configures the inputs for the selected advancing state. At step 276, one of the inputs is selected and a determination is made at step 278 whether that input is a motion request, such as request 100 in the control diagram 70 of FIG. 4. If so, the program execution branches to step 280 where a determination is made whether the selected motion request input is to make an ON-to-OFF change for this state. An ON-to-OFF change is represented by a "one" bit stored in state sub-file entry 162 for this input. Only the particular advance request signal that initiated the motion in the present advancing state could make an ON-to-OFF change, since only that motion request would be ON legitimately in an advancing state. All other motion requests could only make an OFF-to-ON transition in this state, although such changes are rare because they only happen when the machine is being operated manually. Therefore any motion inputs that were previously configured for an OFF-to-ON change in the input levels entry 162 will have the corresponding next state entry 169 in the state sub-file 160 set to the initialize step 135 of the directed sequencer at step 284. As previously described, the directed sequencer in the initialize step looks for a valid state in which to continue operation. For example, if the RETRACT REQUEST signal goes active (i.e. makes an OFF-to-ON logic level change) in an advancing state 125-128, a conflict exists as both the RETRACT REQUEST and ADVANCE REQUEST signal are active. In such an event, a transition must occur to the initialize step 135 of the directed sequencer program in order for the conflict to be resolved.

If the present input is the motion request which initiated the advancing of the carriage 20, the program execution transfers from step 280 to step 282 where a determination is made whether the present advancing state is in the maximum stroke position, e.g. state 128 for the advanced position 86. If it is in the maximum stroke position, the compilation process branches to step 286 where the next state entry 169 for this input change is set to the initialize step 135 of the sequencer program. Otherwise, if the current state is not in the maximum stroke position and the motion request goes from ON-to-OFF, the next state entry 169 for the selected input is set to the coast state 133 by step 288. Once the motion request input has been configured, the program execution advances to step 308 of the compilation program.

If, however, the current input being processed for the advancing state is not a motion request, the program execution will advance from step 278 to step 290. At this point, a determination is made whether the input is a switch based on where the input is in the control diagram 70. If the input is not a switch, it is masked in the state sub-file 160 for the directed sequencer at step 298. On the other hand, if the input being processed is a switch, the execution branches to step 292 where it is determined whether it is the next limit switch 51-53 to trip as the carriage 20 moves in the advancing direction. This determination is made by comparing the switch input bit pattern for this position with the switch input bit pattern for the next position along the current direction of travel and seeing if the only input that differs is the current one being processed. If the selected switch is not supposed to be the next one to trip, a tripping of this switch will be in error, and thus the next state entry 169 for the selected input is set to fault state 134 at step 296.

If the present input is for the next limit switch to trip as the carriage 20 advances, the next advancing state with an entry from that input transition is searched for at step 294. For example, when the carriage 20 is in the intermediate position 84 and is operating in state 126 when the feed limit switch 52 trips, a transition should occur to advancing state 127 for the feed position 85. If the advancing state for this transition is not found as determined at step 300, the compiler program creates that state at step 302. Then at step 304, the number of that next advancing state is stored in the next state entry 169 associated with the selected limit switch input.

At step 308, a determination is made whether additional inputs remain to be processed for this advancing state. If so, the compiler program execution returns to step 276 to process that input in a similar fashion. After all of these inputs have been characterized the configuration routine terminates by returning to the main program on FIG. 9B.

Figure 12:
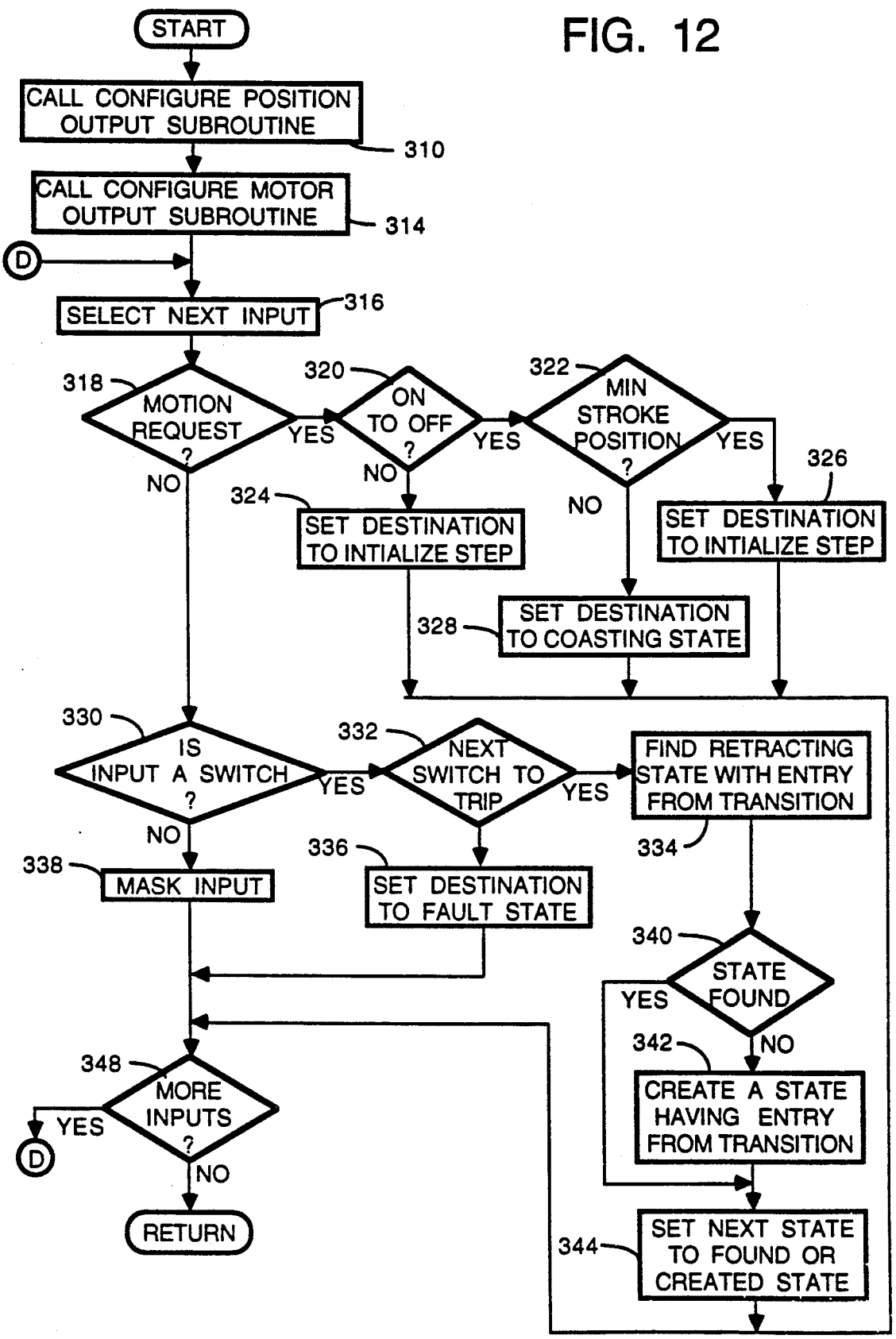

The configuration routine called at step 244 for the retracting states 129-132 is represented by the flowchart of FIG. 12. The steps 310-348 of this compiler routine correspond in function to steps 270-308 just described on FIG. 11 for the advancing states, with obvious differences characteristic of the retracting states. For example, step 322 determines when the state for the minimum stroke position is being defined, instead of looking for the maximum stroke position 86 as occurred at step 282.

Figure 13:
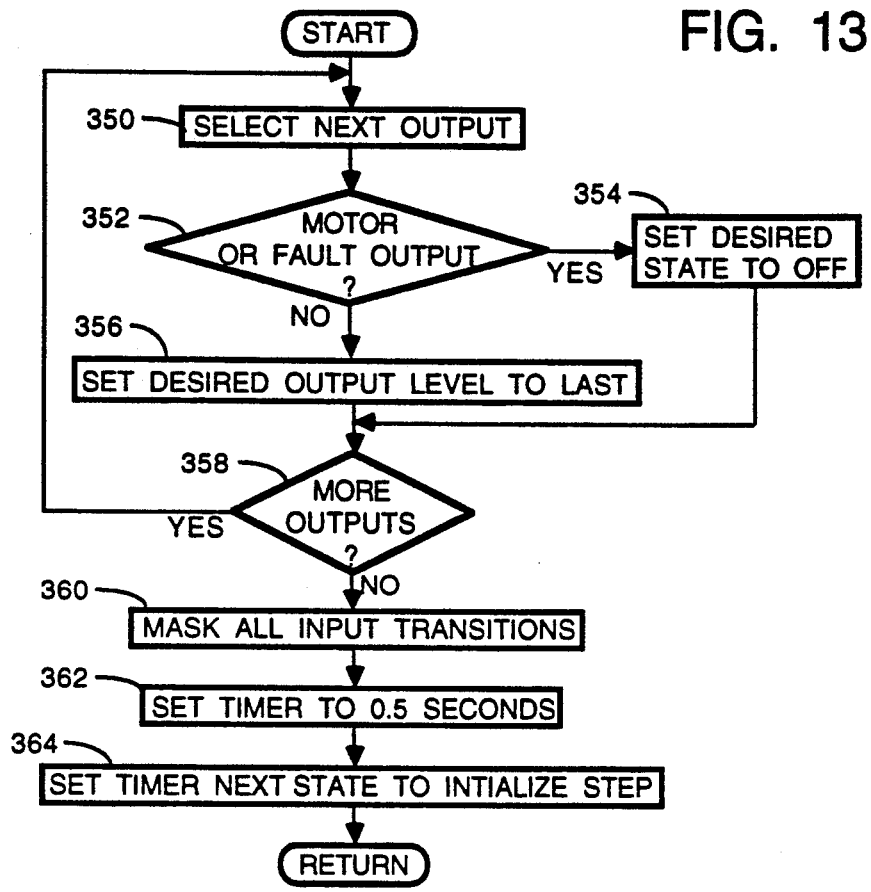

The configuration routine called at step 245 for the coasting state 133 is represented by the flowchart of FIG. 13. For this state, an output is selected at step 350 and a determination is made at step 352 whether this output is for a motor or for the fault output indicator. If it is one of those two types, the output bit in the sub-file output level entry 165 is set to an off logic level at step 354. Otherwise, the output is configured to remain in the last state of that output prior to a transition to the coast state by setting a corresponding bit in entry 164 of the state sub-file 160 at step 356. This process preserves the state of any interlock outputs, allowing there to be a single coasting state regardless of the carriage position. A determination is then made at step 358 whether more outputs for the coast state 133 remain to be configured. If so, the compiler program returns to step 350 to repeat the process to configure the additional output.

When every output for the coast state 133 have been configured, the compilation process advances to step 360 where all of the input transitions are masked as the inputs are not utilized to determine when to make a transition from the coast state. The preset entry 166 for state transition timer is set to one-half second at step 362 which is more than sufficient time for the carriage 20 to come to rest. At step 364 of the compiler program, the state number of zero is stored in the timer next state entry 167 of the coast state sub-file 160 so that a transition will occur to the initialize step 135 of the directed sequencer program from the coast state 133. Thereafter the program execution returns to the main program on FIG. 9B.

Figure 14:
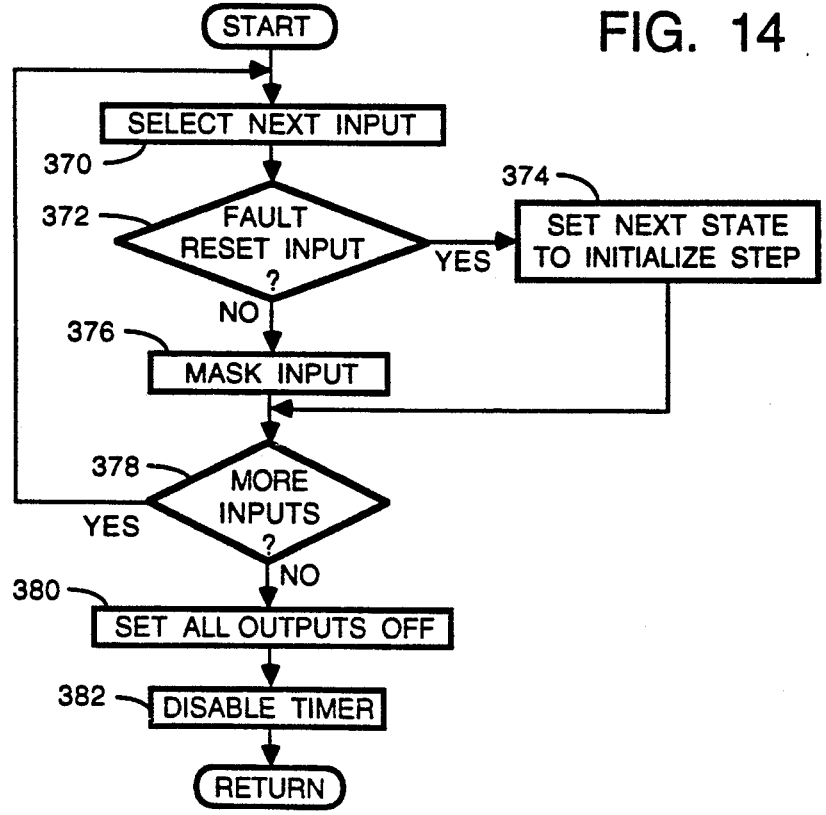
Figure 15:
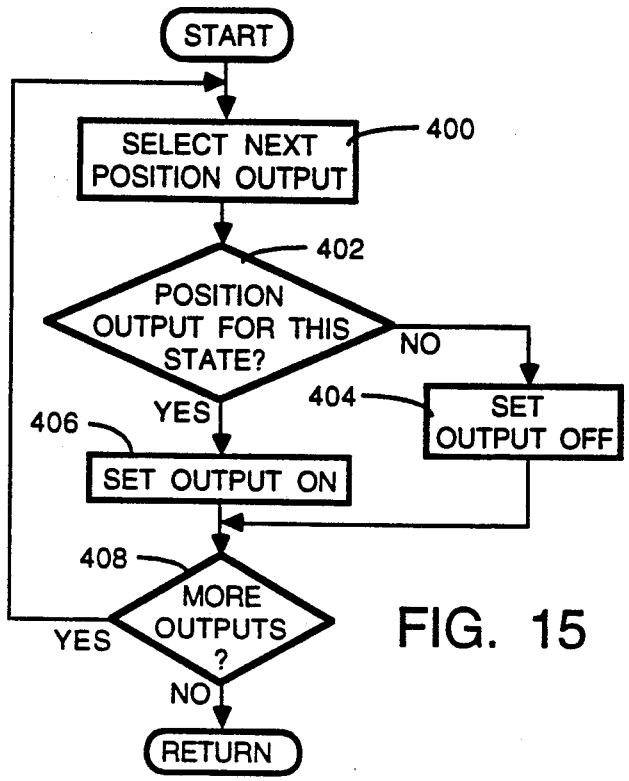
FIGS. 15 and 16 are flowcharts of subroutines that are called from the state configuration routines in FIGS. 10-12.

The flowchart of FIG. 14 depicts the configuration routine called at step 246 for the fault state 134, which commences by selecting one of the inputs at step 370 and determining whether it is the fault reset input at step 372. If so, the next state entry 169 for a change of this input is indicated as being state zero, the initialize step 135 of the directed sequencer. Otherwise, the selected input is masked at step 376, as it is not the fault reset input. Then a determination is made at step 378 whether additional inputs for the fault state 134 need to be configured and if so, the compiler program execution returns to step 370. After all of the inputs for the fault state 134 have been configured, all the outputs for the fault state sub-file entry 165 are set to off at step 380 and the state timer is disabled at step 382. The program execution then returns to the main program on FIG. 9B.

After the program editor software in terminal 49 has created the sequencer data files for the states of the control process, those files are transferred from the RAM 63 of the programming terminal 49 into the programmable controller 40 where the files are stored in memory of the processor module 46. The processor module memory also contains a ladder logic control program that includes a directed sequencer instruction. Thereafter, the programmable controller can be placed into the program execution mode in which the ladder logic control program is executed. When the programmable controller 40 encounters the directed sequencer instruction, it invokes the directed sequencer program which is part of its operating system. The directed sequencer program utilizes the sequencer files loaded from the programming terminal 49 in controlling the operation of the machine 10 as was done by previous directed sequencer programs.

The invention being claimed is:

1. A programming apparatus for an industrial controller which has a processor module that stores and executes a sequencer program to control a machine; the programming apparatus comprising:

means for generating a behavior profile that depicts a desired operation of the machine in a plurality of operational positions as a two-dimensional graph with distance of machine movement represented along one dimension and machine speed represented along another dimension;

means for identifying movement actuators on the machine and to specify a status for each movement actuator when the machine is operating in each of the plurality of operational positions;

means for specifying input devices from which the industrial controller receives signals and an operational event of the machine which causes each input device to produce a signal;

means for specifying an output device and an operational position of the machine at which the industrial controller is to send a signal to the output device; and a compiler responds to all aforementioned means by producing data in a format which is readable by the sequencer program with the data being produced from information about the behavior profile, each movement actuator, the input devices and the output device.

2. The programming apparatus as recited in claim 1 further comprising a display device for displaying the behavior profile as well as information about each movement actuator, the input devices and the output device.

3. The programming apparatus as recited in claim 1 wherein the machine moves a member through the plurality of operational positions along a linear axis, wherein the data produced by said compiler is contained in a file that is divided into sub-files, and wherein said compiler comprises:

a first mechanism for creating a separate stationary state sub-file for each position of the member with each sub-file contains data defining the operation of the machine when the member is stopped in one of the positions; and a second mechanism for creating a separate advancing state sub-file for each operational position which advancing state sub-file contains data defining the operation of the machine when the member is moving in a first direction at one of the operational positions.

4. The programming apparatus as recited in claim 3 wherein said compiler further comprises a third mechanism for creating a separate retracting state sub-file for each position which retracting state sub-file contains data defining the operation of the machine when the member is moving in a second direction at one of the operational positions.

5. The programming apparatus as recited in claim 3 further comprising a third mechanism for creating a fault state sub-file containing data that defines the operation of the industrial controller when a malfunction occurs.

6. The programming apparatus as recited in claim 3 further comprising a third mechanism for creating a coast state sub-file containing data that defines the operation of the industrial controller when every actuator is deactivated and the member still is moving.

7. The programming apparatus as recited in claim 1 wherein said means for the user to specify input devices includes a mechanism for defining a switch that is connected, whether the switch is normally opened or normally closed, and in which of the plurality of operational positions the switch is tripped.

8. The programming apparatus as recited in claim 1 wherein the data for the sequencer program defines a plurality of operational states for the machine and the data is divided into a plurality of groups; each of which corresponds to one operational state and comprises data specifying an expected status for at least some of the input devices, a status for each output, and an input device which is to change status when a transition should occur to another one of the plurality of operational states.

9. The programming apparatus as recited in claim 1 further comprising means for transferring the data to the processor module.

10. An apparatus for programming a programmable controller which includes a processor module that executes a sequencer program to control operation of a machine to move a member into a plurality of positions along a linear axis; the apparatus comprising:

a monitor for displaying information;

a first means for a user of the programmable controller to create, on said monitor, a two dimensional graph of a behavior profile depicting the operation of the machine when the member is in each of the plurality of positions;

a second means for the user to create, on said monitor, a designation of actuators on the machine and whether each actuator is to be activated when the member is located at each of the plurality of positions;

a third means for the user to create, on said monitor, a symbolic representation of input devices on the machine and of a status of each input device when the member is located at each of the plurality of positions;

a fourth means for the user to create, on said monitor, a symbolic representation of an output of the programmable controller and a symbolic indication of one of the plurality of positions of the member at which the programmable controller is to send a signal to the output;

a compiler that responds to information created by all aforementioned means by producing a file of data for the sequencer program, the file defining a plurality of operational states for the machine and is subdivided into a plurality of sub-files, each sub-file corresponding to one of the plurality of operational states and containing data specifying an expected status of at least some of the input devices, statuses for the output and each actuator, and an input device which is to change status when a transition should occur to another one of the plurality of operational states; and a device for transferring the file of data produced by the compiler to the programmable controller.

11. The apparatus as recited in claim 10 wherein one actuator is a motor, and said second means enables the user to designate each speed and each direction in which the motor can operate.

12. The apparatus as recited in claim 10 wherein the behavior profile includes a designation of a speed at which the machine is to be operated in each of the plurality of operational positions.

13. The apparatus as recited in claim 10 wherein said compiler comprises:

a first mechanism for creating a separate stationary state sub-file for each position which sub-file contains data defining the operation of the machine when the member is stopped;

a second mechanism for creating a separate advancing state sub-file for each position which advancing state sub-file contains data defining the operation of the machine when the member is moving in a first direction along the linear axis; and a third mechanism for creating a separate retracting state sub-file for each position which retracting state sub-file contains data defining the operation of the machine when the member is moving in a second direction along the linear axis.

* * * * *